United States Patent [19]

Hofmann

[11] Patent Number: 4,689,748
[45] Date of Patent: Aug. 25, 1987

[54] DEVICE FOR AIRCRAFT AND SPACECRAFT FOR PRODUCING A DIGITAL TERRAIN REPRESENTATION

[75] Inventor: Otto Hofmann, Kirchstockach, Fed. Rep. of Germany

[73] Assignee: Messerschmitt-Bölkow-Blohm Gesellschaft mit beschränkter Haftung, Fed. Rep. of Germany

[21] Appl. No.: 842,066

[22] Filed: Mar. 20, 1986

Related U.S. Application Data

[63] Continuation of Ser. No. 755,535, Jul. 15, 1985, abandoned, which is a continuation of Ser. No. 615,668, May 31, 1984, abandoned, which is a continuation of Ser. No. 194,430, Oct. 6, 1980, abandoned.

[30] Foreign Application Priority Data

Oct. 9, 1979 [DE] Fed. Rep. of Germany ....... 2940871

[51] Int. Cl.[4] ...................... G06G 15/50; G01C 11/08
[52] U.S. Cl. .................................... 364/456; 358/103; 358/109; 364/424
[58] Field of Search ....... 324/330; 343/5 CM, 5 MM; 353/5, 6, 11, 12; 364/454, 456, 518, 571, 577, 515, 424; 358/103, 105, 109; 382/34, 42

[56] References Cited

U.S. PATENT DOCUMENTS

| | | | |
|---|---|---|---|
| 2,989,890 | 6/1961 | Dressler | 353/5 |
| 3,191,170 | 6/1965 | Lustig et al. | 343/5 CM |
| 3,648,039 | 3/1972 | Kowalski | 343/5 MM |
| 3,725,915 | 4/1973 | Herman et al. | 343/5 CM |
| 3,864,513 | 2/1975 | Halajian et al. | 358/109 |
| 3,866,229 | 2/1975 | Hammack | 364/456 X |
| 4,144,571 | 3/1979 | Webber | 343/5 MM X |
| 4,164,728 | 8/1979 | Marsh | 343/5 MM X |
| 4,168,524 | 9/1979 | Soltz et al. | 364/571 |
| 4,313,678 | 2/1982 | Colvocoresses | 356/2 |

OTHER PUBLICATIONS

"Principles of Analytical Photogrammetry"; American Society of Photogrammetry: Manual of Photogrammetry third edition, vol. 1, pp. 465–471, 1966.

*Primary Examiner*—Errol A. Krass
*Assistant Examiner*—Edward R. Cosimano
*Attorney, Agent, or Firm*—Toren, McGeady & Goldberg

[57] ABSTRACT

A device for use on aircraft or spacecraft provides data corresponding to the course and orientation of the craft, and a digital display of the terrain over which the craft is travelling. The device includes at least first, second and third sensor lines consisting of parallel rows of photosensitive semiconductor elements arranged transversely of the flight path of the craft. The sensor lines provide line images corresponding to terrain images directed onto the lines, and the lines are spaced apart from each other so that a first terrain image sensed by the lines during a first scanning period partially overlaps a second terrain image sensed by the lines during a second, successive scanning period. The device also includes a lens system for continuously directing the terrain images onto the lines, and systems for reading out and storing the line images from the sensor lines during each scanning period and for correlating certain picture reference points in the second terrain image with the same picture reference points in the first terrain image. A computer then operates to determine the orientation of the second terrain image in accordance with intersections, at each of the picture reference points on the terrain, of homologous image rays produced during the first and second scanning periods.

1 Claim, 6 Drawing Figures

DEVICE FOR AIRCRAFT AND SPACECRAFT FOR PRODUCING A DIGITAL TERRAIN REPRESENTATION

This is a continuation of application Ser. No. 755,535, filed July 15, 1985, which was a continuation of application Ser. No. 615,668 filed May 31, 1984, both now abandoned, which, in turn, was a continuation of now abandoned application Ser. No. 194,430 filed Oct. 6, 1980.

BACKGROUND OF THE INVENTION

The present invention relates to a photogrammetric device for use in aircraft or spacecraft. The device generates orientation data, the course or flight path of the aircraft or spacecraft, and produces a digital terrain representation by the use of photo sensitive semiconductors arranged in lines or rows.

In the science of earth observation from the air or from space, it is customary to survey the surface of the earth being passed over by an aircraft or space vehicle by the use of linear arrays of charge-coupled elements ("CCD's") which operate as sensors. These arrays include normally ca 1700 or more elements arranged in rows. An entire row is arranged at right angles to the aircraft trajectory, and the individual elements are successively and electronically read out to provide sensed image lines. See "Interavia," December 1978, at 1160. This method provides the decided advantage of allowing a direct optoelectronic conversion of the signals generated in the sensor into digital data, and permits storage of this data on magnetic tape or the like. Also, further processing of the data in computers is then possible. With the aid of high speed computers, evaluation in real time is also possible without intermediate storage.

With this image scanning device, the coordinates of discrete image points, as well as the light intensity, can be measured in a digital manner. On the whole, the descripted technology mentioned above offers the possibility of direct transmission of the found data to the ground stations by means of telemetry and fully automated computer processing. Therefore, this technology is now used in the fields of topographic mapping, photogrammetry, navigation, distant exploration, military reconnaissance, and the like.

However, a disadvantage lies in the fact that an exact geometric evaluation of the sensed image lines is not yet possible. This is a defect inherent with the technology of line sensing generally. While a conventional photograph, which has a central perspective, yields an exact geometrical allocation across its entire area, this central perspective is not present with line sensing, i.e., the perspective is reduced to the central perspective geometry of each individual scanning line.

Each line of an image, within one image strip, is attributed with any inherent external orientation, since the sensor carrier is in motion in relation to its position as well as its inclination, and such motions are either approximately known, or not known at all. This fact constitutes a principal hurdle prohibiting a geometric evaluation. Until now, in order to solve this problem, it has been suggested to use a continuous measuring technique for the external orientation by way of external means, e.g., gyroscopic platforms, inertial methods and the like. Also, it is known to employ distortion correction methods using ground reference points.

Finally, attempts are made to predict position during flight on the basis of statistical forecasts. All of these methods have the decided disadvantage of being cumbersome and relatively expensive, because of the necessity of additional instrumentation, manual intermediate processes, or the determination of a large number of reference points.

SUMMARY OF THE INVENTION

An object of the present invention is to provide a device of the type described above, wherein information in digital form and with unequivocal coordinate determination, such as a distortion-free representation or read-out of the terrain, can be generated from scanning data which is subjected to fully automated processing.

The problems mentioned above are solved by providing a sensor device which includes at least first, second and third sensor lines arranged transversely of the flight path, parallel with one another and spaced apart by a certain image base distance, and a lens system cooperatively associated with the three sensor lines. The optical system enables three overlapping image strips to be generated by the three sensor lines as the optical system continuously scans the terrain passed over by the device. The optical system may include either a common lens, or a different lens associated with each sensor line for directing images of the terrain onto the sensor elements of each line, wherein the orientation ofthe lenses and the sensor lines relative to one another is known.

By way of correlation, image points of a newly-to-be tied in right-hand line image on the second and third sensor lines, and the corresponding image points on the first and second sensor lines forming parts of the left-hand line images can be found. The left-hand images are backwardly offset by about one base distance or base length. By intersection of homologous rays, the orientation of the newly-to-be-tied in right-hand line image can be computed.

A special advantage resides in the fact that a fully automated, digital, three dimensional representation of the terrain, and the assignment of radiation and reflection values is possible without additional components. Because of the large number of tied in images, there results a considerably enhanced degree of accuracy as compared to conventional picture triangulation methods.

These and other features of the invention are pointed out in the claims. Other objects, advantages and embodiments of the invention will become evident from the following detailed description when read in the light of the accompanying drawings.

BRIEF DESCRIPTION OF THE DRAWING

In the drawing:

FIG. 1b is a representation of the sensor device as viewed from the top of FIG. 1a;

FIG. 2b is a representation of the sensor device as viewed from the top of FIG. 2a;

DETAILED DESCRIPTION OF THE INVENTION

The present invention makes use of the principle of aerial triangulation by tying in sequential images. Sequential image tying in is based on the generation of central perspective aerial pictures with approximately 60% overlap, and the tying in of each individual picture with the preceding picture by means of relative orientation. This orientation is effected in such a way that the picture coordinates of at least five identical points in adjacent pictures are measured in both pictures. Through the computation of ray intersection points, picture inclinations and the position of the sequential picture with relation to the preceding picture can be computed. In this manner, a strip of many pictures in sequence can be created, and its absolute orientation within a primary system of coordinates, e.g., Gauss-Krüger or UTM, can be determined if the absolute position of at least one picture—usually one at the beginning of the picture strip—is known in the system.

Until now, the above method could not be implemented on a picture strip generated by lines because the central perspective relationship was lacking.

Figure 1A:
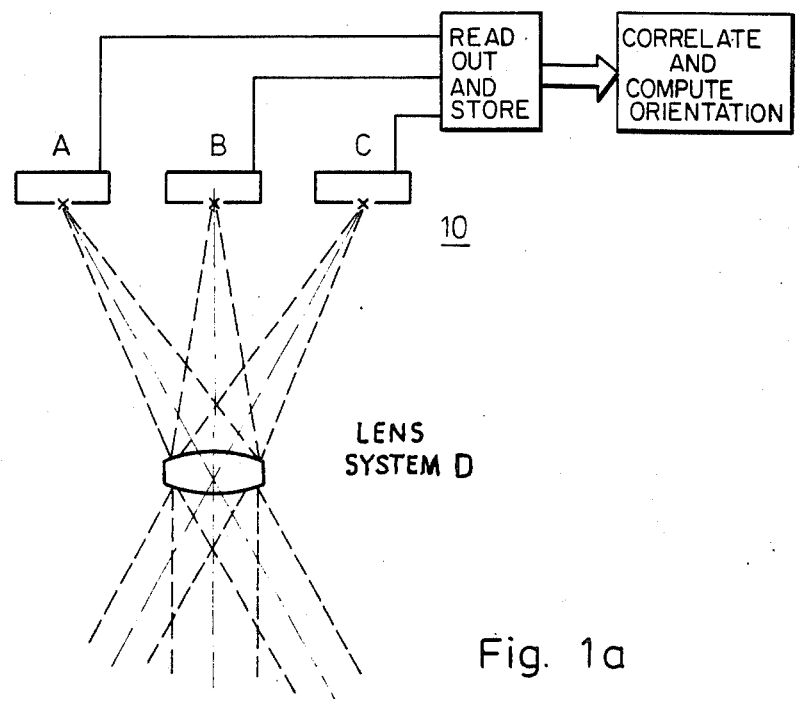
FIG. 1a is a schematic representation of a sensor device according to the invention, including three lines or rows of sensor elements and an optical system.
Figure 1B:
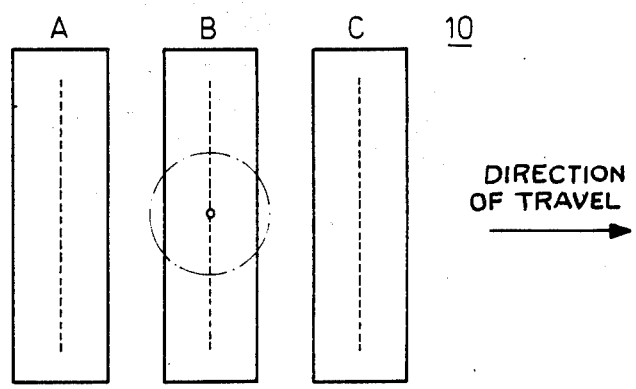

This problem has been eliminated by the device 10 of FIGS. 1a and 1b. In an image plane, three sensor lines or rows A, B, and C of photosensitive elements are provided parallel with one another, transversely of the flight path of the aircraft or spacecraft on which the device is carried, and spaced apart by distances corresponding to the image base (see FIGS. 1a and 2a). An exact central perspective geometric relationship is therefore reproduced in the three sensor lines A, B, and C. If reference or orientation points are selected along the sensor lines A, B, and C, the principle of sequential picture tying in can also be applied.

Accordingly, it is now possible, in principle, to compute the relative orientation of this device 10 or "stereo line scanner" for each individual line scan period by causing the rays defined by a certain number of points, e.g., six, of one scanning period or "line image", to intersect or correlate with corresponding image point rays of line images which are backwardly offset by approximately one base length.

Figure 2A:
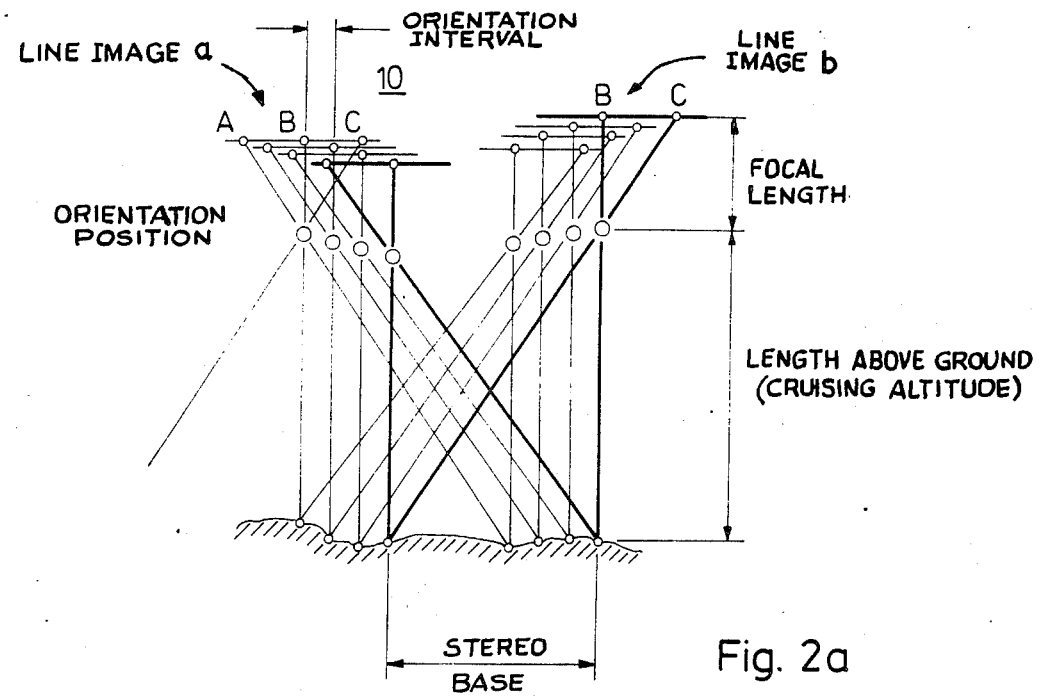
FIG. 2a is a schematic representation of the sensor device at two sequences of positions along a trajectory or flight path.
Figure 2B:
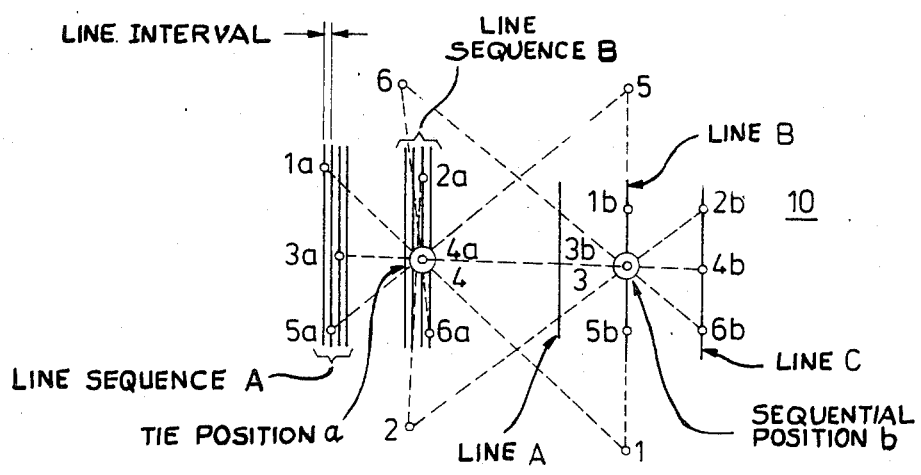

FIGS. 2a and 2b demonstrate the principle of operation which basically does not depart from the method of central perspective sequential image tying in. The orientation points 1 through 6 in the line image to be tied in, b (sequential position b) have been distributed in such a way that three points 1b, 3b, and 5b are arranged on the center line B, and three points 2b, 4b, 6b are arranged on the rearwardly looking line C. The corresponding points 1a through 6a on the picture or pictures rearwardly offset by approximately one base length are arranged there on the central line sequence B and the forwardly looking line sequence A.

Figure 3:
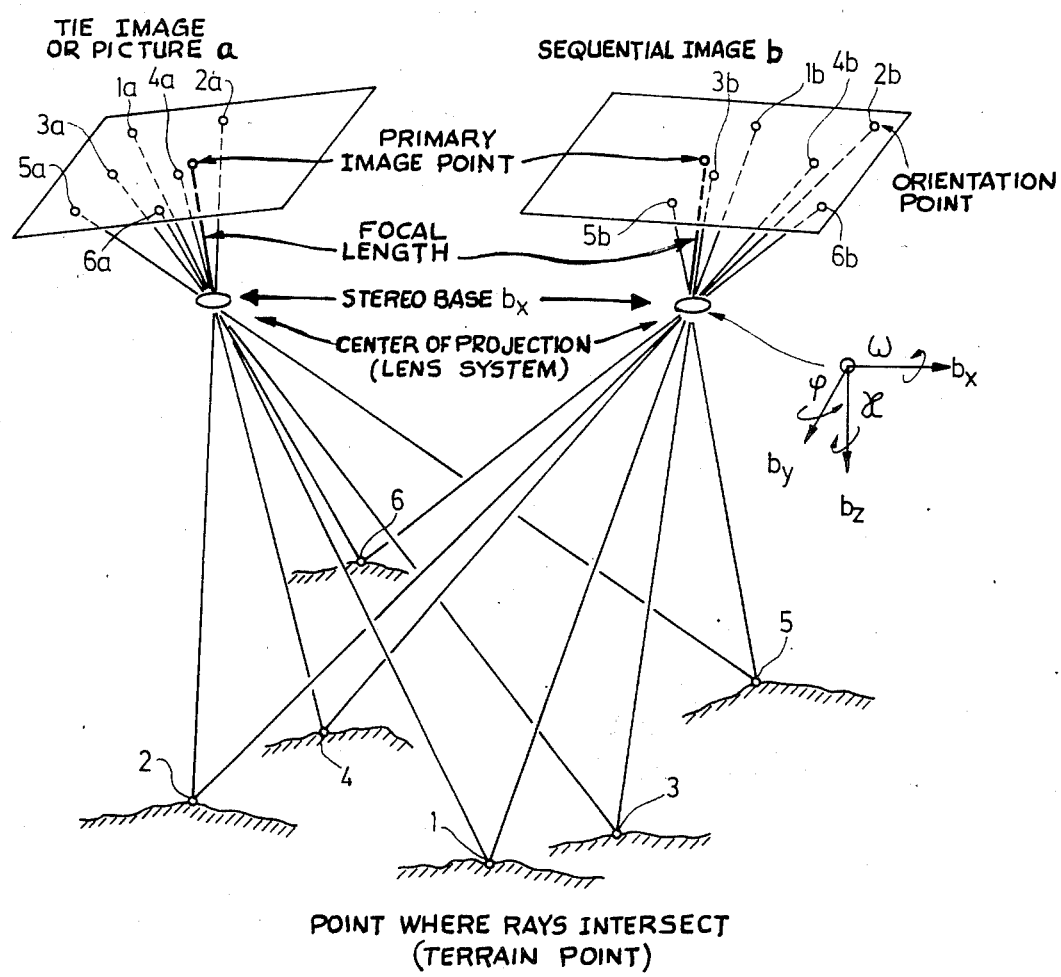
FIG. 3 shows intersections of homologous rays emanating from fixed orientation points on the terrain.

FIG. 3 shows the intersection of homologous rays of a forward or right-hand line image as viewed in FIG. 3, to be tied in with left-hand line images which have been rearwardly offset, wherein the left-hand line image has been selected as a reference line image. Vectorially, the intersecting condition can be represented mathematically as follows:

$$(b - \Delta b_n) \cdot [(\lambda_{Ln} L_n \zeta_{Ln}) \times (\lambda_R R \zeta_{Rn})] = 0 \qquad (1)$$

Wherein:

b is the base vector between the new, right-hand line image and the left-hand reference line image.

$\Delta b$ is the differential vector between the left-hand reference line image and the other left-hand line images.

$\lambda_{Ln}$ scalar enlargement factors of the left-hand line images.

$L_n$ rotation matrices of the left-hand line images.

$\zeta_{Ln}$ image coordinate vector of the orientation points of the left-hand line images with respect to the coordinate system of the image.

$\lambda_R$ scalar enlargement factor of the right-hand line image.

R rotation matrix of the right-hand line image.

$\zeta_{Rn}$ image coordinate vector of the orientation points in the right-hand line image with respect to the system of coordinates of the image.

With this intersecting condition (1), and spatial resections with other, already known points of the terrain, the unknown orientation parameters of the right-hand line image, namely the rotation matrix R with its parameters $\omega$, $\phi$, $\kappa$, and the base vector b with its components $b_x$, $b_y$, $b_z$ are determined.

If the scanning is done by an arrangement wherein each of the sensor lines has a different lens system assigned to it, and if the orientation between these lens systems and the sensor lines is known, nothing will basically change as far as this computational method is concerned.

The method requires that at the start of each strip, the orientation, i.e., the exact position coordinates and the inclination of the sensor 10, be known, at least over one base length for each line image. If these initial conditions are met, any number of lines can theoretically be additionally oriented, and an image strip of any length which is self-orienting can be generated. In addition, and depending on the degree of accuracy required, the image strips can be supported and, in any chosen manner, extended by means of a few reference points or fields of reference points.

Once the orientation data, position and inclination have been computed for each individual line, the lines can be reduced to normal positions and an accurate, distortion-corrected image strip can be produced. In the chosen arrangement of the device 10 having three lines, A, B, C, three overlapping strips are produced. By spatial intersection, the terrain coordinates X, Y, Z of each terrain point can be computed. The search required in this method for image coordinates of corresponding points in the various line images is effected by means of correlation in accordance with known methods. Since the line image points are available to the computer without any intermediate manual steps, a fully automated evaluation becomes possible. Besides a scanning unit and a computer, all that is required for a graphic reproduction of a distortion-corrected picture strip (Orthoprojection) is an appropriate plotter.

The correlation of coordinated image points on the various lines A, B, C cannot be achieved with one single image point, but must cover a more or less extensive area around the orientation point, otherwise any correlation which represents a similarity criterion will not be possible. This means that adjacent lines have to be used for the image points lying within the zone or area. Therefore, the adjacent lines must be transformed to the central perspective geometry of the reference line. This is possible only in such cases where their orientation is known. As far as the backwardly offset adjacent lines are concerned, that orientation is known. As far as the forwardly offset, yet unoriented lines are concerned, it is possible to extrapolate relatively accurately because of their immediate proximity, and to increase the precision of the entire process by iteration.

Since the line sequence, in relation to the changes in external orientation, is relatively high, relatively accurate initial values can be obtained for each line orientation and also for the correlation, so that, only a few iterations are to be expected. However, it is not necessary to orient each line image according to this method, since this can also be done at certain orientation intervals.

The line orientation parameters located in between are determined solely by interpolation. There are accurate grounds for the correlation in that, in the orientation points, the terrain relief is already known, or can be approximately extrapolated with relative ease because of the immediate proximity of the previously determined terrain sector. By taking into consideration the terrain relief and the image line orientation, the image zones around the orientation points can be reduced to normal positions and correlated without any difficulty.

The orientation points of each sensor position to be newly determined are located exactly on the center line B and the line C looking rearwardly, wherein preferably an excess number of points can be selected in order to be able to increase the degree of accuracy by adjustment and the location of the points can also be determined by, e.g., correlation criteria.

Because of the differences in heights of the terrain relief and departures of the sensor device 10 from its normal position, the corresponding image points on the line images which are rearwardly offset by one base length are not located on the center line B and on the line A looking forwardly of only one line image, but are located in the line images of various, more or less adjacent positions (FIGS. 2a, 2b and 3). The orientation parameters of the line images, however, are already known and can be inserted directly into equation (1).

As mentioned before, a distance of at least one base length is initially presupposed within which the absolute orientation of the sensor device 10 is known, or must be determined for each line image. This could be achieved with external aids like gyros, bearing-taking or navigational systems. Instead, a purely computational approach is provided for determining the orientation data by way of a digital terrain model which is assumed to be known. This approach is compatible with the overall process since, to a large degree, identical methods of computation and formulae are used which are also utilized for the sequential line tying in operation. This digital "title strip" terrain model is structured exactly like the terrain model to be obtained by scanning, as far as its data structure is concerned. It include an accumulation of points describing the terrain relief, wherein the accumulation of points can be arranged regularly or irregularly, and its digital components form the terrain coordinates X, Y (position) and Z (height), as well as the brightness of the point. This terrain model is available for evaluation in the form of data stored on magnetic tape.

Figure 4:
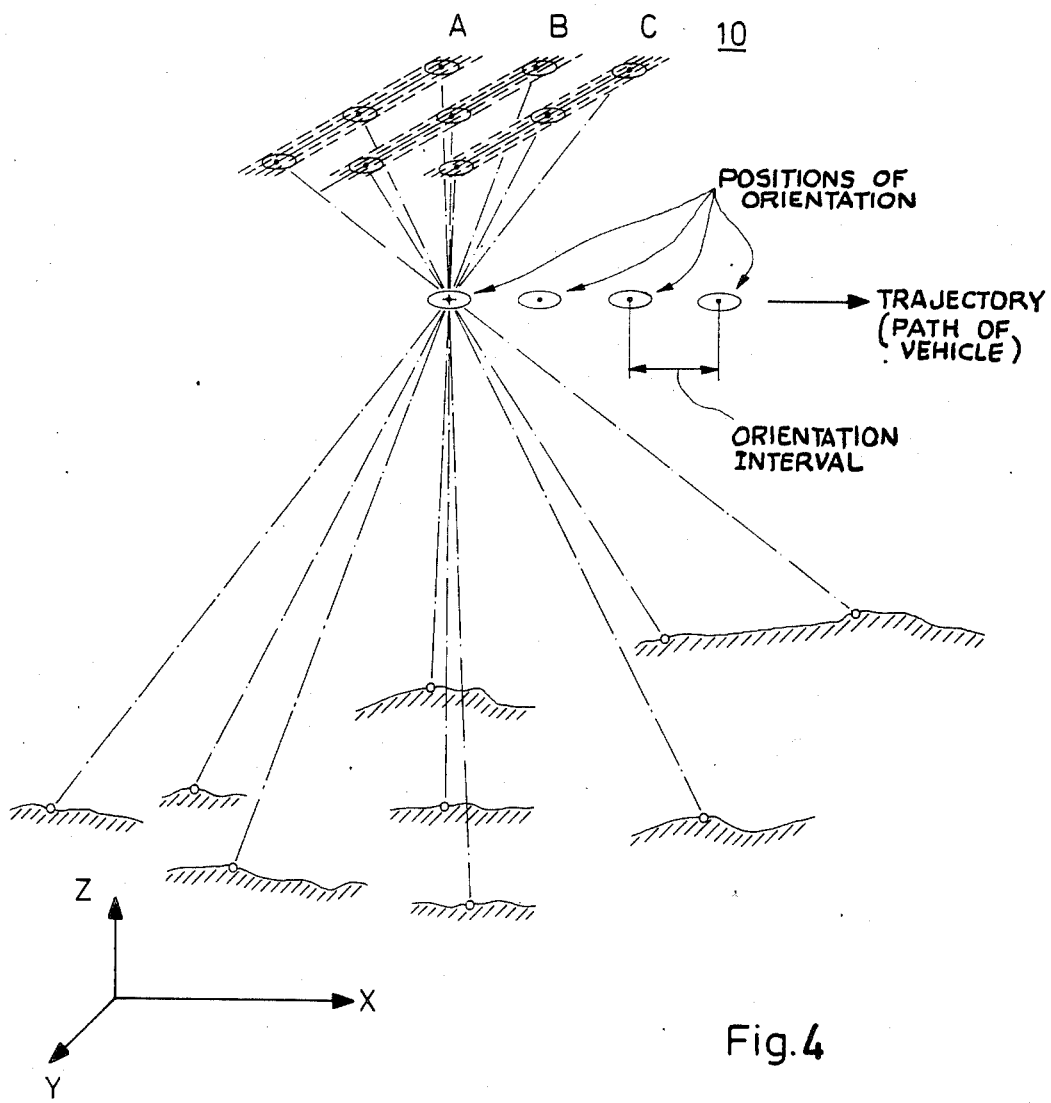
FIG. 4 illustrates the determination of an initial orientation of the sensor device during flight.

The scanning of the initial portion of the terrain by the three line sensor device 10, by correlation of at least three image points with three corresponding points of the stored digital terrain model and spatial resection, permits the determination of the position and location of the sensor device 10, or its carrier, during any time interval. In such case, the arrangement of orientation points can be selected in regular groups of six, or nine points each, and the accuracy and reliability of the process can be enhanced by redundancy and adjustment (see FIG. 4). Suitable means are available for the acquisition of digital terrain data.

Each line is processed relative to a line or line sequence which is backwardly offset by the base interval. This means that the problem of error propagation is no greater than would be the case with conventional aerotriangulation using central perspective pictures wherein each tied in picture represents a forward movement of one base interval length. In contrast, according to the invention, many lines located between a base interval are processed independently from one another relative to lines which are backwardly offset by a full base interval.

Image strip triangulation is therefore achieved with a high degree of redundancy (see FIGS. 2a and 2b). This condition can be used to provide a stabilizing effect by equalization, so that a favorable error transmitting factor for one image strip can be expected.

By using reference points or fields of points in the middle or at the end of the strip, the degree of accuracy can be enhanced in a known manner. The use of reference points of this kind can also be achieved in fully automated manner, thereby keeping the entire system homogenous. As mentioned above, areas of any size can be scanned by way of parallel image strips which are subsequently combined. Using another embodiment of the sensor device 10 and the process described herein, the course of aircraft can be determined since the determination of the orientation of the sequential line images is identical with the determination of the inclination and position of the aircraft which carries the sensor device 10. This may be done subsequently, after all data have been stored. The evaluation of the image data, that is, the orientation as well as the course computation of the digital terrain data, can also be handled in real time by a computer or, if appropriate, a multi-processor. This method has the decided advantage of allowing the desired and required data to be available immediately, since all image data need not be stored prior to evaluation (course of the vehicle, terrain data). It will suffice to intermittently store the data obtained by scanning with the three sensor lines A, B, and C, for approximately one base length. Storage of this relatively limited amount of data can be suitably effected with a semiconductor memory having direct access to a real time processor. Subsequent to processing by the real time processor, the original line sensor data is no longer required. The data will continuously pass through the operational semiconductor memory or storage. Only the evaluated data (orientation parameters, course, terrain data) are displayed as required, or stored in a suitable manner.

The real time evaluation process, on board the aircraft or space vehicle, has the further advantage of allowing huge numbers of original image data not to be stored on special magnetic tape of high storage density (so-called High Density Digital Tape "HDDT"), transferred to computer compatible magnetic disks and/or tapes, and finally evaluated. According to the invention, all data and the final results are immediately available, without the aforementioned expensive and time-consuming intermediate storage period.

While specific embodiments of the invention have been shown and described in detail to illustrate the application of the inventive principles, it will be understood that the invention may be embodied otherwise without departing from such principles.

What is claimed is:

1. Method for providing data corresponding to the course and orientation of an aircraft or spacecraft which travels along any arbitrary flight path, and for providing data corresponding to a digital three-dimensional representation of the terrain over which the craft travels by utilizing a device including first, second and third parallel sensor lines each consisting of a row of photosensitive semiconductor elements arranged transversely of the flight path and spaced apart from each other by distances corresponding to a certain image base, and at least one lens system for continuously directing terrain images onto said sensor lines, said sensor lines and said at least one lens system being arranged so that a first sensor line A looks forwardly and a third sensor line C looks rearwardly with respect to the direction of flight and to a second sensor line B looking downwardly, the method comprising the steps of: simultaneously generating by means of said sensor lines at least three sequences of line images, these line image sequences corresponding to a forwardly, a downwardly and a rearwardly looking perspective, and the successive line images of each said line sequence are generated during successive scanning periods and during a scanning period generating one forwardly, one downwardly and one rearwardly looking line image; selecting at least five orientation points on the rearwardly and downwardly looking line images newly generated during the same scanning period; determining by way of correlation the corresponding image points on the downwardly and forwardly looking line images, respectively, which are backwardly offset; computing the orientation and position parameters of the newly generated line images relative to the backwardly offset line images by intersection of homologous rays passing through said orientation points and said corresponding image points on the one hand and through their related projection centers given by said lens system on the other hand; and computing the corrdinates of each terrain point by spatial intersection.

* * * * *